Patented May 6, 1930

1,757,568

UNITED STATES PATENT OFFICE

GUSTAF OLOF WOLFGANG HEIJKENSKJÖLD, OF STOCKHOLM, SWEDEN, ASSIGNOR TO AKTIEBOLAGET BÄSTA, A JOINT-STOCK COMPANY, OF STOCKHOLM, SWEDEN

PREPARATION OF YEAST

No Drawing. Application filed March 7, 1929, Serial No. 345,240, and in Sweden March 14, 1928.

When applying the most modern methods of propagating yeast to sulphite waste liquor as main raw material which as well-known contains from 1.5 to 2.5% fermentable sugar, it has proved possible to obtain about 2 to 3.5 kilograms of yeast per 100 kilograms of liquor including the quantity of seed yeast used amounting usually to about 0.5 kilograms per 100 kilograms of liquor. In normal sulphite waste liquors, the concentration of yeast at the termination of the cultivation amounts to about 2.5% which represents a relatively low value as compared with the concentration of yeast which is usual when using sugar solutions of other kind and which may amount to about 5 to 6%. The low concentration of yeast involves, of course, disadvantages with respect to the utilization of the fermentation tank, the consumption of power for aeration etc., the disadvantages becoming, of course, more prominent, when the liquor is diluted by water before the cultivation, such dilution being in certain cases necessary for facilitating the neutralization and for decreasing the osmotic pressure which is often too high.

It is evident that these disadvantages are always present when using nutritive solutions of low sugar concentration, which at present is generally deemed to be advantageous. It has previously been proposed to eliminate the disadvantages incident to the use of such low concentration solutions by tapping off yeast containing solution from the fermentation tank one or more times, or more or less continuously, during the cultivation, the yeast being then separated from said solution. For instance it was proposed by Rainer as early as 1879, in his German Patent No. 10,135 to withdraw the finished yeast successively when utilizing the so called continuous addition process.

When using sulphite waste liquor as main raw material in the preparation of yeast there is, however, still a drawback which is not eliminated by the aforesaid known method of withdrawing yeast containing solution during the cultivation and which is not present when using more or less concentrated worts of corn, molasses or the like, for which raw materials the above mentioned method was exclusively considered. This drawback is due to the fact that sulphite waste liquor, besides containing fermentable sugar of the above mentioned percentage, also contains great quantities of substances which cannot be utilized by the yeast cells but represent an unnecessary dead-weight and have a detrimental effect on the cultivation. The quantity of such substances may amount to about 10% by weight of the liquor.

The principal object of my invention is to reduce or eliminate the detrimental effect of said substances on the cultivation and to increase the output and quality of the yeast prepared by keeping the concentration of yeast in the fermentation tank sufficiently high. This may be effected according to my invention by withdrawing yeast containing solution from the fermentation tank, when the cultivation has proceeded during a given time, separating yeast from said solution and returning said yeast, in part or entirely, to the fermentation tank, while permitting the separated solution to run away.

It is previously known, for instance by the German Patent No. 269,192, to add the quantity of seed yeast necessary for a given cultivation period, not at one time at the beginning of the cultivation, but in several portions. It has also been proposed to use the yeast separated from the yeast containing solution tapped off as seed yeast in a following stage. However, these methods were only considered for worts prepared from corn, molasses or the like, which are relatively favorable for the activation of life of the yeast without containing considerable quantities of detrimental dead-weight substances, that is worts from raw materials which are naturally in a high concentrated state; and it could not be foreseen that withdrawing of yeast containing solution and returning to the fermentation tank the yeast separated therefrom in cultivating yeast in sulphite waste liquor as main raw material would involve the above mentioned advantageous effect with respect to the output of yeast and the quality of the yeast prepared.

A further object of my invention is to provide a method of utilizing, for the cultivation of yeast, sugar containing solutions which originally have a low sugar concentration, especially sulphite waste liquor, said method comprising supplying the sulphite waste liquor during the cultivation at such rate that the sugar is immediately assimilated by the yeast for building up new cells while simultaneously withdrawing a corresponding quantity of fermented sulphite waste liquor from the fermentation tank, the yeast contained in said withdrawn liquor being, if desired, returned to said tank.

In carrying out my invention I may proceed as follows: The seed yeast is sown in sugar solution which is more favorable for yeast cultivation than sulphite waste liquor, as for instance a solution of molasses of suitable concentration, e. g. having a specific weight of 1.016 to 1.02. The quantity of seed yeast should preferably be greater than the quantity of seed yeast which corresponds to the amount of sulphite waste liquor which the fermentation tank can hold, for instance 2 times more than such normal quantity of seed yeast. In practice, a quantity of seed yeast of about 8 kilograms or more per cubic meter of sulphite waste liquor which the fermentation tank can hold has proved suitable. When the growth has started, the sulphite waste liquor is permitted to run into the tank. A given time after the beginning of the supply of sulphite liquor, for instance when the concentration in the fermentation tank has increased to a specific weight of about 1.03 on account of the quantity of dead-weight substances of the sulphite waste liquor, part of the wort in fermentation is tapped off and conducted through a yeast separator. The yeast thus obtained is returned to the fermentation tank, while the separated wort is permitted to run away. The wort thus withdrawn is replaced by new quantities of sulphite waste liquor and other nutritive substances and, if necessary, water, the supply of sugar and the concentration being regulated in any suitable manner. The withdrawal of wort may take place one or more times during the course of the yeast cultivation, or preferably continuously as will be described below.

It has proved in practice that on account of the great quantity of seed yeast used the nutritive substances and the sugar in the sulphite waste liquor successively added will be almost entirely immediately assimilated by the yeast so that the concentration in the fermentation tank of for instance sugar sinks very rapidly from the normal percentage of sugar in the sulphite waste liquor of between 1.5 and 2.5% down to about 0.1% and then still further. At the termination of the yeast cultivation the sugar content amounts to about 0.06 to 0.08% which remainder of sugar cannot, consequently, be utilized. From this it is clear that withdrawal of wort during the cultivation according to my present invention only represents an unimportant loss of sugar, as the difference between the sugar content in the wort separated off, i. e. about 0.1%, and the final sugar content which cannot be utilized, i. e. 0.06 to 0.08%, is extremely small.

The supply of sulphite waste liquor may be, and preferably is, continued without interruption during the whole yeast cultivation, and also after the withdrawal has begun. When begun the withdrawal is preferably carried out continuously and regulated in relation to the supply of sulphite waste liquor, for instance in such manner that the quantity of wort will increase in the fermentation tank at essentially the same rate as in cultivation without such withdrawal. The yeast separated off is likewise preferably returned to the tank continuously. In practice it has proved to be suitable to regulate the supply and the withdrawal in such manner that the sugar concentration in the fermentation tank will be slightly decreasing.

By starting with a great quantity of seed yeast, tapping off yeast containing solution and returning the yeast separated therefrom to the fermentation tank in accordance with my new invention the yeast concentration in the tank will, of course, increase. In addition to the advantages of a better utilization of the fermentation tank and a decrease of the power consumption for the aeration, the additional great advantage is gained that the yeast output is increased and the quality of the yeast is improved, as the wort is successively liberated from detrimental dead-weight substances introduced with the sulphite waste liquor as well as from products formed during the cultivation and acting also detrimentally, the quantity of such substances and products per unit of weight of yeast being thus considerably decreased. The yeast cultivation may, for instance, be carried out at a concentration corresponding to a specific weight of 1.03, whereas in cultivating yeast according to previous methods the concentration at the termination has amounted to a specific weight of about 1.05.

By my present method it will also be possible to work with very diluted sulphite waste liquor, for instance with washing waters from the wood pulp digesters. A greater dilution of the sulphite waste liquor is also permitted which seems to be suitable for a better separation on neutralization of the substances in the liquor detrimental for the yeast.

What I claim is:—

1. In a cultivating yeast and utilizing sulphite waste liquor as main raw material, the method of withdrawing wort from the fermentation tank during the cultivation, separating yeast from said wort and returning such yeast to said tank, while permitting the separated solution to run away.

2. In cultivating yeast and utilizing sulphite waste liquor as main raw material, the method which comprises sowing seed yeast in a sugar solution in a fermentation tank, adding sulphite waste liquor successively and continuing the cultivation, withdrawing yeast containing solution from said tank, separating yeast from said solution and returning such yeast to said tank, the withdrawal of yeast containing solution being so adapted in relation to the successive supply of sulphite waste liquor that the quantity wort in the tank increases at essentially the same rate as when cultivating yeast without such withdrawal.

3. In cultivating yeast and utilizing sulphite waste liquor as main raw material, the method which comprises starting the cultivation in a fermentation tank with a quantity of seed yeast greater than the quantity of seed yeast corresponding to the quantity of sulphite waste liquor which said tank can hold, withdrawing yeast containing solution from said tank during the cultivation, separating yeast from said solution, and returning such yeast to said tank, while permitting the separated solution to run away.

4. In cultivating yeast and utilizing sulphite waste liquor as main raw material while applying the so called continuous addition process, the method which comprises withdrawing yeast containing solution from the fermentation tank during the cultivation, separating yeast from said solution and returning such yeast to the fermentation tank, while permitting the separated solution to run away, the addition and the withdrawal being so regulated as to keep a slightly decreasing sugar concentration in said tank.

5. A method of utilizing, for yeast cultivation, sugar solutions which originally have a low sugar concentration, which comprises adding such sugar solution to a fermentation tank successively at such rate that the sugar is immediately assimilated by the yeast in building up new cells, withdrawing simultaneously a corresponding quantity of fermented wort from said tank, separating yeast from said wort and returning such yeast to the tank.

6. In cultivating yeast and utilizing sulphite waste liquor as main raw material, the method which comprises starting the cultivation in a fermentation tank with a quantity of seed yeast amounting to at least 8 kilograms per cubic meter of sulphite liquor which said tank can hold, withdrawing yeast containing solution from said tank during the cultivation, separating yeast from said solution and returning such yeast to said tank, while permitting the separated solution to run away.

7. In cultivating yeast and utilizing sulphite waste liquor as main raw material, the method which comprises sowing seed yeast in a fermentation tank in a sugar solution which is more favorable for yeast cultivation than sulphite waste liquor, adding sulphite waste liquor successively and continuing the cultivation, withdrawing yeast containing solution from said tank, separating yeast from said solution and returning such yeast to said tank, while permitting the separated solution to run away.

In testimony whereof I affix my signature.

GUSTAF OLOF WOLFGANG HEIJKENSKJÖLD.